United States Patent Office 3,586,482
Patented June 22, 1971

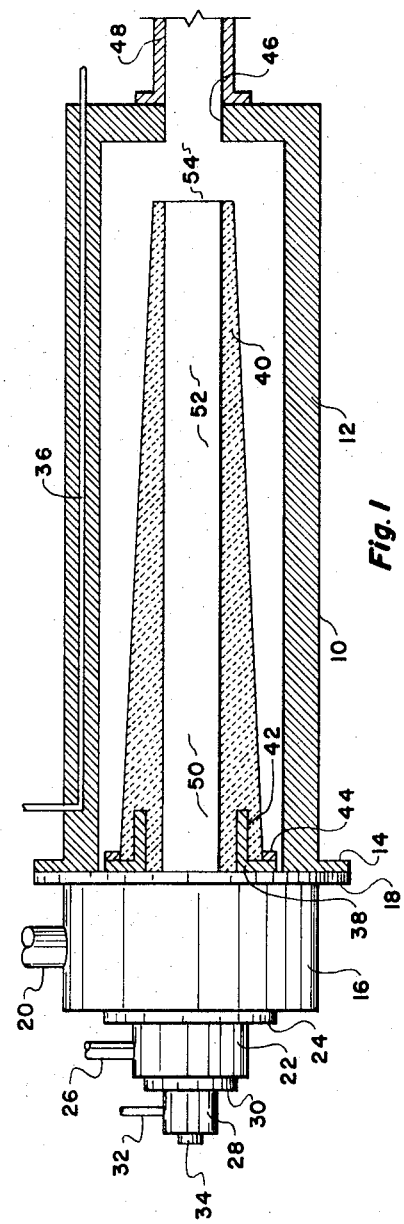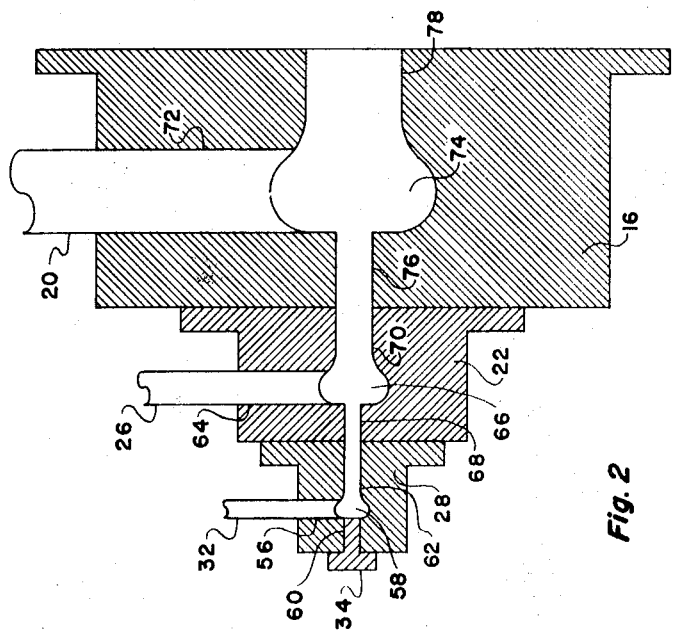

3,586,482
APPARATUS AND PROCESS FOR PRODUCING CARBON BLACK
Kenneth D. Hewitt, Houston, Tex., assignor to Continental Carbon Company, Houston, Tex.
Filed Apr. 16, 1969, Ser. No. 816,706
Int. Cl. C09c 1/50
U.S. Cl. 23—209.4
8 Claims

ABSTRACT OF THE DISCLOSURE

Apparatus and process for producing oil furnace carbon black by the thermal decomposition of select carbon black forming hydrocarbon feedstocks in an elongate reactor having a reactor housing enclosing a reaction tube. The raw material components are axially injected into the reaction tube subsequent to passage through at least two axially aligned vortex units. A hydrocarbon fuel, an oxygen-containing gas and the hydrocarbon feedstock are introduced tangentially into separate vortex chambers having axially aligned and connected apertures to cause rapid mixing by the application of sheer forces. The combustion mixture of the oxygen-containing gas and fuel introduced under pressure is ignited and combusted to cause the feedstock to be rapidly decomposed to carbon black and combustion gases in the reaction tube. The reaction products and partially formed carbon black pass through the reaction tube and are subjected to cooling upon formation of the black by passing the effluent through a void space between the end of the tube and a central aperture at the downstream end of the reactor housing. The cooling is effected by the circulation of a coolant medium through the reactor housing shell so the stream of combustion products and black can be recovered from the reactor for separation of the carbon black from said products without water quenching.

BACKGROUND OF THE INVENTION

Field of the invention

The present invention relates to the manufacture of furnace carbon black which is produced basically by a partial combustion process to effect the thermal decomposition or cracking of a hydrocarbon feedstock to carbon black and the accompanying products of combustion. A suitable hydrocarbon feedstock is introduced into a heated reaction zone in the presence of a deficiency of oxygen-containing gas to cause the partial combustion process to be applied to the feedstock for conversion to carbon black and furnace effluent combustion or reaction gases. The combined stream of carbon black suspended in combustion gases is cooled by passage through the void space between the end of the reaction tube and the termination of the reactor housing in order to reduce the temperature sufficiently to terminate the carbon black forming reaction. The suspending combustion gas stream is subjected to a series of treatment steps to separate the carbon black from the gas and provide for the collection of the carbon black for additional processing. This invention is concerned only with the reactor and the reaction process by which the carbon black is created, so this disclosure is limited to the furnace reactor or production portion of the manufacturing process.

Carbon blacks are produced by several processes, namely the channel, furnace combustion, furnace thermal, and oil furnace processes. The channel blacks are produced by impingement of small natural gas flames on the surface of metal collection elements. Channel blacks have been substantially relegated to specialty uses and ink manufacture by the other blacks produced by later developed processes, and manufacture of channel blacks is not considered or included in the scope of the present invention.

The furnace thermal process produces the coarsest carbon blacks that are generally used in applications requiring a high carbon black loading and minimal reinforcing of the rubber. Thermal blacks have, in addition to large particle size, almost complete absence of structure. The thermal blacks are conventionally produced by the thermal decomposition of gaseous feedstock either natural gas or acetylene, by intermittent operation of an insulated furnace utilizing heating and production cycles.

The furnace combustion process produces carbon blacks that are generally used for reinforcement of rubber used as tire stocks in which low heat generation is important. These blacks are generally referred to as the gas furnace blacks and are produced by the thermal decomposition of a portion of a feedstock, with the remaining of the feedstock being combusted under oxygen deficient conditions to provide the necessary heat for the carbon forming reaction. Basically the feedstock for furnace combustion blacks is natural gas, however, the practice of enriching the feedstock by injecting liquid hydrocarbon is becoming more prevalent as the natural gas fields become depleted.

The oil furnace process produces the carbon blacks that are used more than all others by the manufacturers of rubber for tires and related applications. These rubber reinforcing blacks are produced by the thermal decomposition or cracking of hydrocarbon feedstocks that are at least partially liquid at normal ambient conditions and have a substantial aromatic content. The feedstock is introduced into an enclosed furnace to be contacted with the heat of decomposition generated by the separate combustion of a mixture of fuel and oxygen-containing gas to form the carbon black from the oil feedstock. The characteristics of the oil furnace blacks produced in the reactor are dependent upon combustion conditions, stream flow pattern, composition of the hydrocarbon feedstock and other raw materials, reaction time, and operating conditions within the reactor during production.

The presently disclosed invention is directed particularly to the production of oil furnace carbon blacks.

DESCRIPTION OF THE PRIOR ART

Apparatus for the production of oil furnace carbon black comprises for purposes of the present disclosure the reactor and auxiliary components for its operation to the point in the reactor at which termination of the carbon black forming reaction is completed. The prior art applicable to this general area thus defined, is substantial, but pointedly does not teach or anticipate the present disclosure.

Oil furnace carbon black reactors are generally of cylindrical elongate configuration and are disposed horizontally. The reactor conventionally consists of axially aligned zones of combustion, reaction and quench; with these various zones having different longitudinal dimensions and frequently having different diameters. The fuel and oxygen-containing gas mixture is introduced in varied patterns into the combustion zone, then the combustion products and heat are applied to the feedstock introduced into the reaction zone. These raw material components are usually introduced through an injection assembly and burner arrangement comprising one or more independent devices inserted into the reactor to place the material at the appropriate point of introduction, particularly an axially disposed device having several consecutive conduits of varying lengths is used. The carbon black reaction is terminated in the quench zone downstream of the reaction zone, and the black exits the reactor for additional processing.

SUMMARY OF THE INVENTION

The invention of this present application includes apparatus and process for the production of furnace carbon black in said apparatus by the thermal decomposition of a suitable hydrocarbon feedstock in an elongate cylindrical reactor. The housing of the reactor has a closure member at the downstream end with a central aperture and an open upstream end with a flange adapted to be affixed to the first of a plurality of axially aligned vortex units with each unit having a vortex chamber and being fitted with an axial discharge passageway and an aperture communicating axially through each chamber. The feedstock components are injected tangentially into each vortex chamber by an inlet connected to a suitable conduit extending to a supply source. The interior of the reactor housing includes a conduit for passage of coolant therethrough and encompasses a reaction tube which is affixed to the downstream face of the first vortex unit; said tube being axially aligned with the vortex units to receive the feedstock components and terminated in spaced relationship from the centrally apertured downstream housing closure member. The feedstock components are introduced tangentially into the appropriate vortex chambers under pressure for rapid mixing and passage axially into the reaction tube. A mixture of an oxygen-containing gas and a fuel is formed and combusted, with the carbon black forming feedstock being injected into the resultant hot combustion gases in the reaction tube for the formation of black and effluent gases. The combustion gases and entrained black are cooled to terminate the reaction and then withdrawn from the reactor for separation and recovery of the black.

BRIEF DESCRIPTION OF THE DRAWING

The annexed drawing sets forth in detail illustrative views of the invention, wherein like reference numerals designate like parts, as follows:

FIG. 1 represents a side elevation, partially in longitudinal section, illustrating an oil furnace reactor apparatus of the present invention; and FIG. 2 represents an enlarged cross sectional view of a portion of the apparatus of FIG. 1, particularly the vortex units.

DESCRIPTION OF PREFERRED EMBODIMENTS

The present invention can be readily understood from the following detailed description and by reference to the drawing, particularly FIG. 1. The furnace carbon black reactor is generally designated by reference 10 and the reactor is comprised of an elongate cylindrical reactor housing 12 having a flange 14 exteriorly disposed about the upstream end which is adapted to be affixed to the remainder of reactor 10 comprising particularly the plurality of vortex units described below.

The air vortex unit 16 has an exterior flange 18 that is adapted to be affixed to reactor housing 12 by suitable means such as welding or threaded bolts. The air vortex unit 16 includes an air injection conduit 20 that extends to a suitable source of supply and means, not shown, for providing air under pressure to said unit 16.

A fuel vortex unit 22 has an exterior flange 24 adapted to be affixed by suitable means to said air vortex unit 16. The fuel vortex unit includes a fuel injection conduit 26 that extends to a suitable source of supply and means, not shown, for providing fuel under pressure to said unit 22.

Additionally a feedstock vortex unit 28 is affixed to the fuel unit 22 by means of an exterior flange 30 attached by suitable means. The feedstock vortex unit includes a feedstock injection conduit 32 that extends to a suitable source of supply and means, not shown for providing feedstock under pressure to said unit 28. The feedstock unit is also adapted at its upstream end to receive a closure plug 34.

The housing member 12 contains a cooling conduit 36 adapted to circulate a coolant medium through the reactor housing in order to cool the reaction and reduce the temperature of the reaction products and carbon black. The conduit 36 is an integral part of a complete refrigeration system, not shown, of conventional design. The conduit 36 is illustrated to be a single conduit; however it is understood that there can be several conduits and the shape of the conduit can be of any desirable geometrical configuration required within the housing to effect the necessary cooling.

The face of the air vortex unit 16, at the downstream side, has a flanged annular bracket member 38 rigidly affixed thereto. The bracket 38 is adapted to support a refractory reaction tube 40 which has an internal circular bore 42 in the upstream end thereof and an offset shoulder adapted to allow the tube to be inserted on bracket 38. A circular retaining member 44 has an inside diameter to slideably fit about the exterior of tube 40 to be affixed to said bracket 38 to retain tube 40 in place. The tube 40 is shown for illustrative purposes to have a uniform interior diameter and an exterior diameter that gradually diminishes to the downstream end. This arrangement for mounting the reaction tube within the reactor provides a ready means for replacing the tube in the event a new tube or a tube of different size and configuration is needed. The air vortex unit is loosened from the reactor housing and the vortex units and tube withdrawn to permit ready access for substitution of a precast tube in a matter of minutes.

The reaction tube 40 is illustrated as having a uniform interior diameter; however it is to be understood that the straight line flow can be adjusted by causing the interior diameter to be enlarged or diminished from the upstream end to the downstream end of the tube. Additionally it is to be understood that a section of venturi configuration or a choke section can be included within the reaction tube 40 at a point intermediate of said ends. The length of the reaction tube can also be varied with the resultant adjustment in the sizes of the zones of reaction and cooling. These variations in the interior geometry and sizing of the reaction tube obviously control the configuration of the flow patterns through the tube such as increased turbulence with a tube of lesser length or inwardly tapering diameter due to greater effect of the pressure drop across the outlet of the tube. These differences in the reaction tubes control the quality of the carbon black produced therein, and the capability of readily changing the tubes is one of the advantages of the present reactor.

The reaction tube 40 encompasses the combustion zone 50 wherein the oxygen-containing gas and hydrocarbon fuel are introduced for combustion and contact with the carbon black forming feedstock in order to achieve the carbon black formation which occurs through the reaction zone 52 of said tube. The downstream end of tube 40 is axially aligned within housing 12 and the central aperture 46 of the enclosed end of the reactor 10. The reaction tube 40 is terminated to provide a spaced relationship to exist between the tube and said housing closure, thus forming a cooling zone 54 through which the combustion gases with entrained carbon black pass for final cooling prior to exiting the reactor central aperture 46 for movement through the reactor effluent conduit 48 to the collection and recovery equipment for the carbon black, not shown. An optional arrangement in conjunction with the cooling zone 54 is the additional inclusion of a quenching means in the effluent conduit 48 to contact the gaseous stream and black with water to further reduce the temperature as required.

Referring to FIG. 2, the vortex units described above are shown in greater detail. These vortex units are adapted to be operated under substantial pressure and can be subjected to greater precision machining than normally utilized in carbon black producing apparatus. The utilization of the vortex chambers allows the application of the high sheer forces achievable in a vortex having substantial pressure drop and thereby provides the requisite dispersion of the feedstock components with rapidity and completeness for the carbon black reaction.

The feedstock vortex unit 28 has a tangential feedstock inlet 56 extending from the internal wall vortex feedstock chamber 58 which is characterized as having the form of a prolate spheroid. This tangential inlet 56 communicates with feedstock conduit 32. The vortex chamber 58 has an axial aperture 60 extending through its upstream end which is adapted to removably retain closure plug 34. An axial feedstock discharge passageway 62 extends downstream from said chamber 58 through its downstream end, with the capacity of discharge passageway 62 being equivalent to that of inlet 56.

The fuel vortex unit 22 is constructed in substantially the same manner as unit described above with a tangential fuel inlet 64 communicating with the fuel injection conduit 26 and extending into the internal vortex fuel chamber 66. The fuel chamber has an axial aperture 68 extending through its upstream end aligned and communicating with feedstock discharge passageway 62. The vortex fuel chamber 66, also being of prolate spheroidal configuration, has an axial feedstock and fuel discharge passageway 70 extending through the downstream end of said unit and having a capacity substantially equivalent to the combined capacities of inlets 56 and 64.

The air vortex unit 16 is constructed substantially as the units described above, and includes a tangential air inlet 72 communicating with the air injection conduit 20 and extending into the internal vortex air chamber 74. The air chamber has an axial aperture 76 extending through its upstream end aligned and communicating with discharge passageway 70. The vortex air chamber 74, also being of prolate spheroidal configuration, has an axial feedstock-fuel-air discharge passageway 78 extending through the downstream end of said unit and having a capacity sufficient to transfer the mixture of feedstock, fuel and air delivered under pressure therethrough and into the reaction tube.

These vortex units 16, 22 and 28 can be manufactured by machining the same as two halves or by casting the chamber with subsequent boring as required so the same are constructed in such a manner as to be able to withstand pressure as specified below.

In the carbon black reactor of this invention, a preferred embodiment is proposed to include a device as illustrated in FIG. 1 and described above. The overall length of the reactor housing is to be four and one-half feet with an outside diameter of fifteen inches having walls two inches in thickness to provide an inside diameter of eleven inches. The air vortex unit 16 affixed to the upstream end of the reactor housing has a tangential air inlet three inches in diameter with a vortex diameter of six inches and a discharge passageway three inches in diameter and the axial aperture of one inch diameter. The fuel vortex unit 22 has a tangential fuel inlet one inch in diameter with a vortex two inches in diameter and a discharge passageway one inch in diameter with an axial aperture of five-eights inch diameter. The feedstock vortex unit 28 has a tangential feedstock inlet five-eights inch in diameter, a vortex of one inch diameter and a discharge passageway five-eights inch in diameter with an axial aperture five-eighths inch in diameter. The refractory reaction tube attached to the downstream face of the air vortex unit has an inside diameter of three inches uniformly and the outside diameter thereof tapers from nine inches to five inches over the length of four feet. The coolant medium is circulated through a series of ten longitudinal coolant conduits of one-quarter inch diameter equally spaced through the housing.

In operating the subject apparatus in accordance with the process of the present invention, the conditions of combustion are established in the combustion zone 50 of the carbon black reactor by introducing an oxygen-containing gas, such as air, through the air vortex unit 16. Concurrently a gaseous combustion fuel is introduced through the vortex unit 22 and the fuel and gas are mixed in the vortex chamber 74. The closure plug 34 is withdrawn from the feedstock vortex unit and a suitable ignition means, such as a squib, is inserted through at least the discharge passageway 78 in order to cause the ignition of the combustion mixture within the combustion zone 50.

The fuel for combustion can be any hydrocarbon gas such as natural gas, various petroleum refinery off-gas streams, or normally liquid hydrocarbons capable of being substantially vaporized. A typical volume analysis of a preferred natural gas being as follows:

| | Percent |
|---|---|
| Methane | 72.09 |
| Ethane | 9.38 |
| Propane | 6.24 |
| Isobutane | 0.46 |
| N-butane | 1.08 |
| Isopentane | 0.22 |
| N-pentane | 0.25 |
| N-hexane | 0.18 |
| Nitrogen | 9.74 |
| Helium | 0.28 |
| Carbon dioxide | 0.08 |

The oxygen-containing gas for combustion can be air, air enriched with oxygen, or oxygen. The hydrocarbon fuel and oxygen-containing gas are introduced in volumes for a stoichimetric ratio sufficient to provide an amount of oxygen-containing gas slightly in excess of the amount required for complete combustion of the fuel, with the excess oxygen-containing gas being carried through to the reaction zone for combustion of a minor portion of the hydrocarbon feedstock. The combustion of the foregoing mixture to substantial completion occurs at a point which basically defines the downstream limit of the combustion zone within the reactor as evidenced by the maximum heat generation, thus setting the point for commencement of the initial limit of the reaction zone.

The hydrocarbon feedstock capable of forming a suitable carbon black depends upon the reactor design and operating conditions, however such feedstock is generally characterized as a highly aromatic hydrocarbon, as derived from petroleum or coal refining operations, free of deleterious materials, and generally at least partially liquid at ambient conditions. A preferred and suitable feedstock for the manufacture of carbon black in a furnace reactor has the folowing specifications:

| | |
|---|---|
| Gravity, ° API @ 60° F. | 1.1 |
| Viscosity @ 122 F., SSF | 113.7 |
| BS & W, percent | 0.1 |
| Ash, percent | 0.03 |
| Asphaltenes, percent | 8.60 |
| Sulphur, percent | 0.81 |
| Carbon, percent | 91.58 |
| Hydrogen, percent | 8.63 |
| Kinematic vis., centistokes | 240 |
| Characterization factor | 12.5 |
| Box. Mines correlation index | 117.6 |
| Distillation range, ° F.: | |
| IBP | 497 |
| 10% | 624 |
| 20% | 685 |
| 30% | 727 |
| 40% | 767 |
| 50% | 810 |
| 60% | 857 |

After the combustion of sufficient fuel and oxygen-containing gas to heat the interior of the reactor to a stable temperature and the plug having been inserted into aperture 60 of the feedstock unit 28, the hydrocarbon feedstock as described above is introduced into vortex unit 28 and thence into the reaction tube for conversion to carbon black. The feedstock for the embodiment described above is to be introduced at a rate of approximately 7.5 gallons per minute and the gaseous combustion fuel components are injected at an elevated pressure not to exceed 60 p.s.i.g. The injection of the raw material components is effected under conditions of high sheer, cyclonic action and at the elevated pressure causes an instantaneous drop to a subatmospheric pressure ranging from 15 to 19 inches of mercury upon introduction into the reaction tube. This causes a high intensity mixing zone to occur immediately in the upstream end of the reaction tube denominated as the combustion zone. The oil feedstock is thermally dissociated to carbon black and entrained in the combustion gases while moving through the reaction zone 52 of the reaction tube and thence through the cooling zone 54 of the reactor prior to exiting through aperture 46 and conduit 48.

The apparatus and process for manufacturing carbon black as described provides uniformity of operations capable of much closer control due to the fact that there is no conventional burner and injection assembly for the introduction of the raw material components, which is frequently the source of difficulty such as coking. The process and component arrangement as described may be adjusted to accommodates specific feedstock supplies to the extent that the various vortex units may be attached in a different order, if necessary, or additionally the operation can be conducted with a combined component stream being introduced through a single vortex unit, such as an air-gas stream having been previously passed through a mixing device. The feedstock introduction can alternately be accomplished by introducing the feedstock directly into the combustion chamber by either an axial injection tube inserted through the vortex units, or an injection tube inserted from a radial position and extending into the combustion zone. Additionally a further vortex unit can be included in the reactor for the purpose of introducing another component, such as a quality control additive, required for the process.

The production of the various types of carbon black required can be accomplished, as noted above, by changing the reaction tube. The change may be readily effected by disengaging the vortex units from the reactor shell and withdrawing the same including the reaction tube from the reactor; whereafter a precast reaction tube is affixed to the vortex unit connected to the reactor housing. The means for affixing the reaction tube to vortex unit can be other than described above, such as by an interlocking partial flange technique providing for a key and lock arrangement upon rotation of the tube.

Having thus described and disclosed my invention, what is claimed is set forth below.

1. An apparatus for the production of furnace carbon black by the thermal decomposition of carbon black forming hydrocarbon feedstock which comprises:
   an elongate cylindrical reactor housing having a closure member at the downstream end with a central aperture therethrough and an open upstream end with an exteriorly disposed flange;
   a conduit affixed to the closure member of the downstream end of said reactor housing aligned with said central aperture and communicating with the interior of said housing;
   a coolant conduit disposed within said housing member adapted for circulation of a cooling medium therethrough;
   a plurality of axially aligned vortex units joined by connecting means and affixed to the upstream end of said reactor housing by said flange, each of said vortex units having a vortex chamber of increasing size to the most downstream thereof and axially aligned with said reactor housing;
   an inlet extending through each of said units tangentially into said vortex chamber and communicating with an injection conduit connected to a supply source;
   an axial discharge passageway extending from each of said vortex chambers through the downstream end of said unit;
   an axial aperture extending through each of said units from said vortex chamber through the upstream end of said unit;
   a removable closure plug disposed in the axial aperture of the most upstream vortex unit;
   a flanged annular bracket means affixed to the face of the most downstream of said vortex units and extending in axial alignment downstream into said reactor housing;
   a refractory reaction tube having within the upstream end a circular bore adapted to be mounted about said bracket means thereby extending said tube axially into said reactor housing for termination in a spaced relationship from said reactor housing closure member;
   a circular retaining member removably affixed about the upstream of said reaction tube to said bracket means.

2. The apparatus as set forth in claim 1 wherein there are three vortex units.

3. The apparatus as set forth in claim 1 wherein a carbon black forming feedstock injection conduit extends directly into the upstream end of said reactor tube.

4. The apparatus as set forth in claim 1 wherein said effluent conduit includes a quenching means adapted to introduce water into said conduit.

5. The apparatus as set forth in claim 1 wherein said refractory reaction tube has an inside diameter at the upstream end not less than said discharge passageway of the adjacent vortex unit.

6. The apparatus as set forth in claim 1 wherein said refractory reaction tube has a venturi section therein.

7. A process for the production of oil furnace carbon black by the thermal decomposition of a carbon black forming hydrocarbon feedstock which comprises:
   introducing a combustion fuel tangentially into a vortex chamber and passage therefrom into a second vortex chamber;
   introducing an oxygen-containing gas tangentially into the vortex chamber receiving said combustion fuel for complete mixing and transfer of said fuel and gas from the vortex chamber into a refractory reaction tube for combustion;
   combusting said mixture of fuel and gas;
   introducing said feedstock into a tangential inlet and a vortex chamber upstream of said chambers and thereafter passing said feedstock into said first vortex chamber for mixing with said fuel gas and thence through said second vortex for mixing with said fuel and gas mixture into contact with the combustion products in the reaction tube;
   passing the reaction products through the reaction tube;
   passing said reaction products through a cooling zone and outwardly from said reactor as effluent through a conduit; and
   recovering the carbon black from said reaction effluent 8. The process as set forth in claim 7 wherein the combustion fuel and oxygen containing gas are premixed and thereafter passed only through a single vortex chamber prior to combustion thereof.

References Cited

UNITED STATES PATENTS

| | | | |
|---|---|---|---|
| 2,781,247 | 2/1957 | Krejci | 23—209.4 |
| 3,256,066 | 6/1966 | Higgins | 23—259.5 |
| 3,264,065 | 8/1966 | Schirmer et al. | 23—259.5 |
| 3,490,869 | 1/1970 | Heller | 23—209.4 |

EDWARD J. MEROS, Primary Examiner

U.S. Cl. X.R.

23—259.5